United States Patent [19]

Kawamura et al.

[11] Patent Number: 4,837,684

[45] Date of Patent: Jun. 6, 1989

[54] DATA INPUT/OUTPUT SYSTEM FOR APPLICATION SYSTEM IN NUMERICAL CONTROL EQUIPMENT

[75] Inventors: Hideaki Kawamura, Hachioji; Toshiaki Otsuki, Hino, both of Japan

[73] Assignee: Fanuc Ltd., Minamitsuru, Japan

[21] Appl. No.: 153,557

[22] Filed: Feb. 3, 1988

Related U.S. Application Data

[63] Continuation of Ser. No. 65,073, Jun. 17, 1987, abandoned, which is a continuation of Ser. No. 755,333, filed as PCT JP84/00516 on Oct. 26, 1984, published as WO85/02032 on May 9, 1985, abandoned.

[30] Foreign Application Priority Data

Oct. 27, 1983 [JP] Japan ............................... 58-201816

[51] Int. Cl.$^4$ ............................................. G06F 15/46
[52] U.S. Cl. ............................... 364/474.11; 364/900; 364/133; 364/136
[58] Field of Search ... 364/200 MS File, 900 MS File, 364/131, 133, 136, 137, 167, 191, 192

[56] References Cited

U.S. PATENT DOCUMENTS

| | | | |
|---|---|---|---|
| 3,171,099 | 2/1965 | Foulkes | 364/200 |
| 3,680,055 | 7/1972 | Wilson | 364/200 |
| 4,204,253 | 5/1980 | van den Hanenburg et al. | 364/200 |
| 4,396,973 | 8/1983 | Imazeki et al. | 364/136 |
| 4,396,987 | 8/1983 | Inaba et al. | 364/191 |
| 4,415,965 | 11/1983 | Imazaki et al. | 364/136 |
| 4,513,379 | 4/1985 | Wilson et al. | 364/900 |
| 4,519,026 | 5/1985 | Nozawa et al. | 364/131 |
| 4,549,276 | 10/1985 | Inaba et al. | 364/474 |
| 4,550,366 | 10/1985 | Toyama et al. | 364/136 |

FOREIGN PATENT DOCUMENTS

53-16176 2/1978 Japan ................................. 364/136

*Primary Examiner*—John R. Lastova
*Attorney, Agent, or Firm*—Staas & Halsey

[57] ABSTRACT

A data input/output system for an application system (AS) which is provided with a processor (6) and a memory (8) therefor and is connected to numerical control equipment (NC) to take partial charge of its NC functions. The data input/output system makes it possible for the application system (AS) to input thereinto and output therefrom a program via an input/output interface (5) provided on the NC side, and to command the NC from the application system (AS) side. A receiving circuit (9 to 15) receives a program delivered from an NC processor (3) and a transmitting circuit (9 to 15) transmits to the NC processor (3) the program stored in the memory (8) of the application system. Data is input to and output from the application system (AS) via the input/output interface (5) provided in the numerical control equipment (NC).

1 Claim, 5 Drawing Sheets

DATA INPUT/OUTPUT SYSTEM FOR APPLICATION SYSTEM IN NUMERICAL CONTROL EQUIPMENT

This is a continuation of co-pending application Ser. No. 065,073, filed on June 17, 1987, which is a continuation of co-pending application Ser. No. 755,333, filed as PCT JP84/00516 on Oct. 26, 1984, published as WO85/02032 on May 9, 1985, both now abandoned.

BACKGROUND OF THE INVENTION

The present invention relates to a data input/output system for an application system in numerical control equipment.

A maker who manufactures and sells numerically-controlled machine tools usually implements them by combining machine tools of their own making with numerical control equipment developed and manufactured by a numerical control equipment maker. In this case, since the numerical control equipment is not specially designed to be applicable only to a certain type of machine tool, but is applicable to various types of machine tools, it is difficult for the numerically-controlled machine tool maker to exhibit their own characteristic feature in functional parts of the numerical control equipment of the numerically-controlled machine tool built by themselves. Their own features are limited specifically to functional parts of the machine tools. For this reason, there has been a strong demand for development of numerical control equipment of the type that will permit the numerically-controlled machine tool maker to easily present their characteristic features in the functional parts of the numerical control equipment.

FIG. 1 is a functional block diagram of numerical control equipment proposed to meet the above demand, in which an application system AS is added to a part equivalent to conventional numerical control equipment NC. This application system ranks with the NC in an NC machine tool system in terms of the priority for software execution, and permits the machine tool maker to prepare, by themselves, some of the NC functions such as sequence control between the NC and the machine tool, conversion of input data, control of an MDI (Manual Data Input device) and a CRT, etc.

Incidentally, the application system AS is formed, in practice, by a processor system comprising a processor, a memory and so forth. Accordingly, its operation is defined by a program stored in the memory. Therefore, it is desired that it is possible to input the program into the application system AS and, conversely, to read out the program for output.

SUMMARY OF THE INVENTION

An object of the present invention is to enable the application system AS side to input and output a program and so on, through use of an RS232C or like interface provided on the NC side.

Another object of the present invention is to make it possible to command the NC from the application system AS side.

The data input/output system of the present invention for an application system which is provided with a processor and a memory therefore and is connected to numerical control equipment to take partial charge of the NC function, comprises a receiving circuit for receiving a program delivered from an NC processor and a transmitting circuit for transmitting a program stored in the memory to the NC application system through an input/output interface provided in the numerical control equipment.

BRIEF DESCRIPTION OF THE DRAWINGS

FIG. 1 is a functional block diagram of numerical control equipment which has an application system AS;

FIGS. 3 to 8 are flowcharts of the operation of the present invention.

DETAILED DESCRIPTION OF THE PREFERRED EMBODIMENT

Figure 1A:
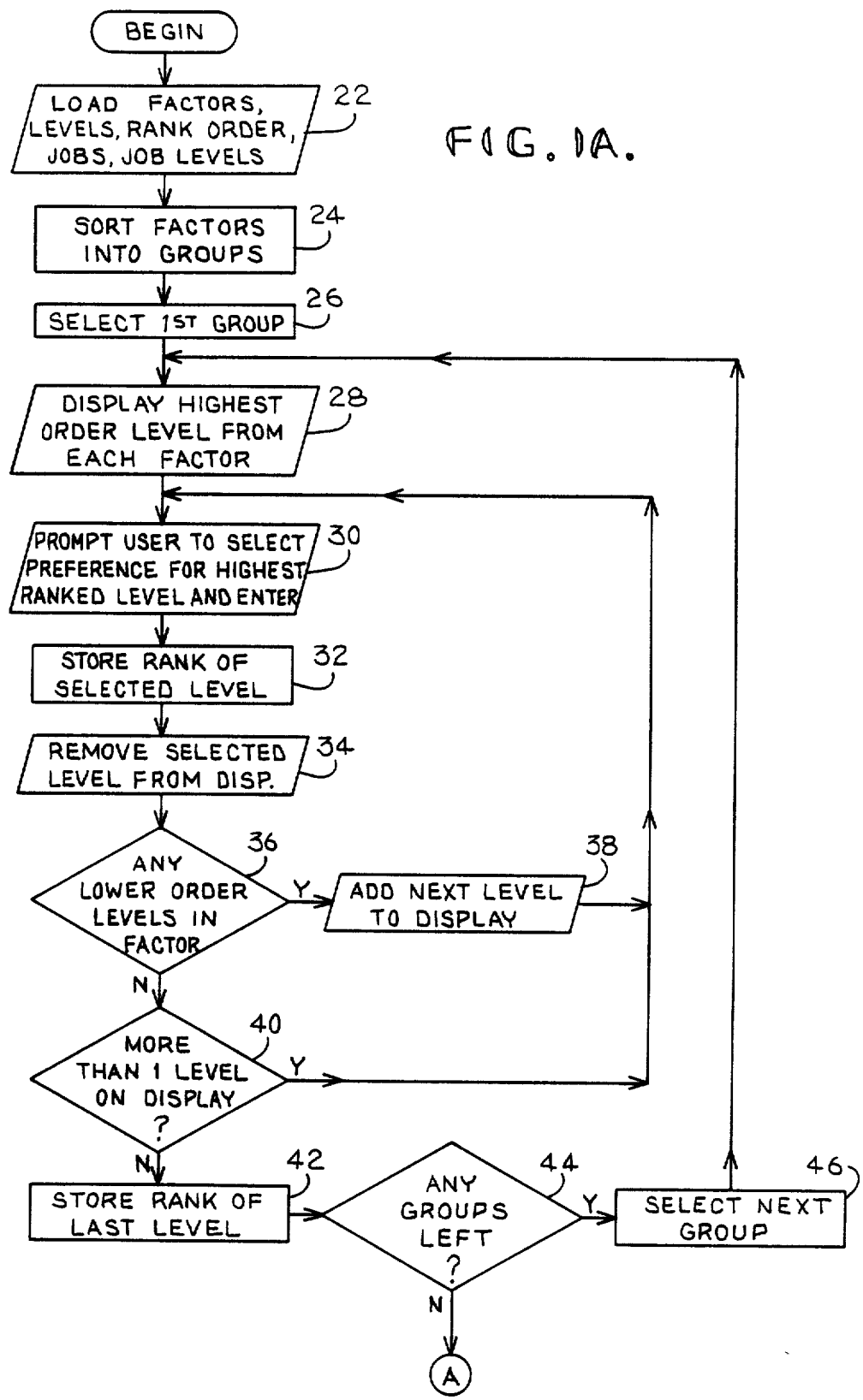
Figure 1B:
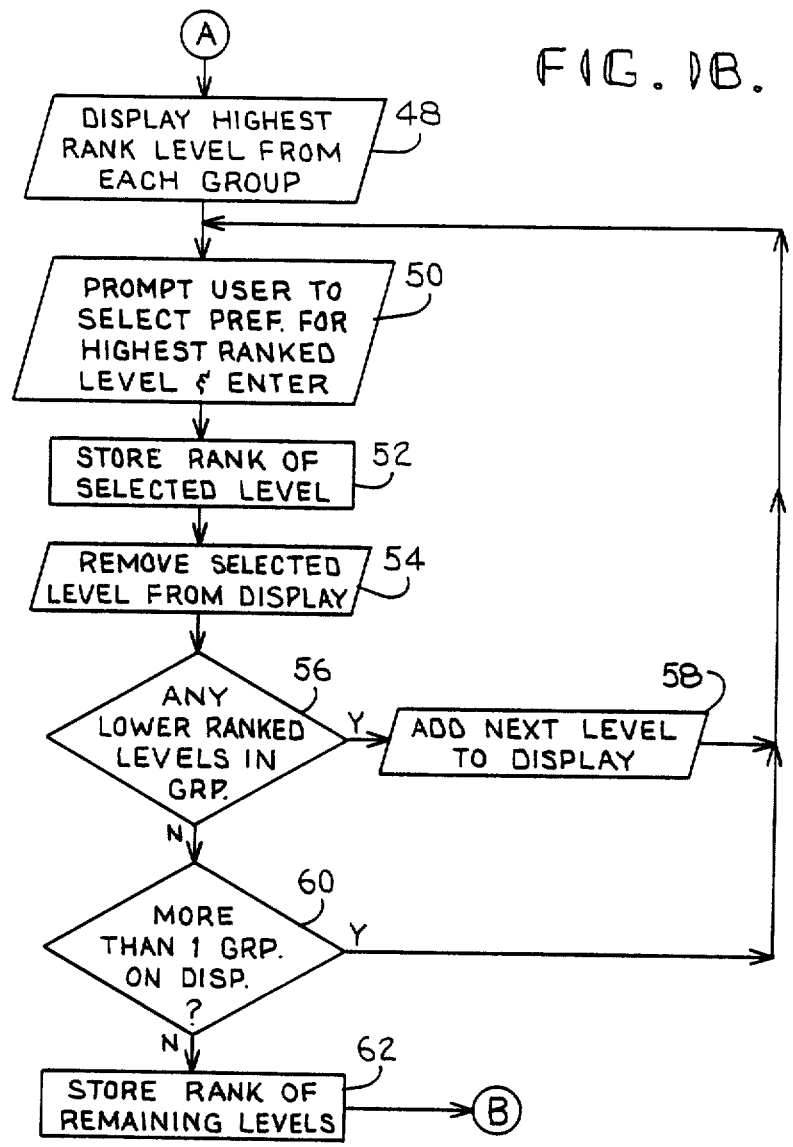
Figure 2:
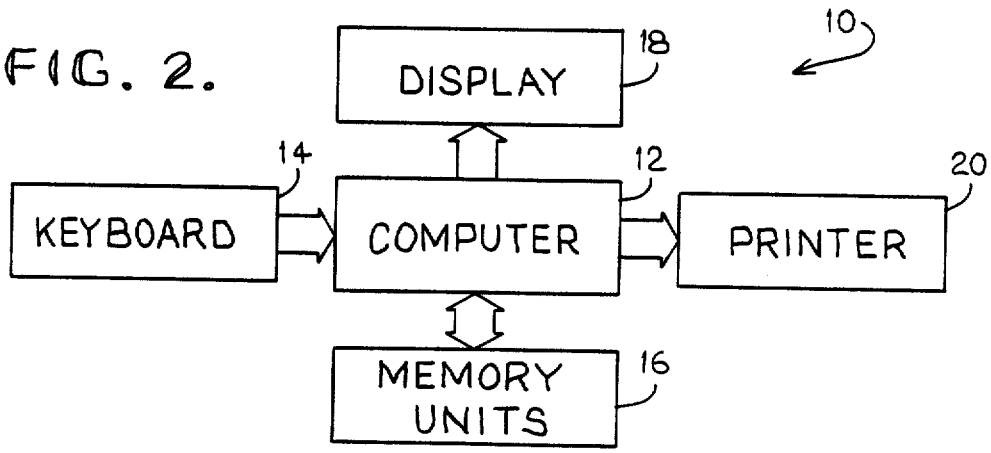
FIG. 2 is a block diagram of a principal part of an example of the hardware construction of numerical control equipment embodying the data input/output system of the present invention.
Figure 1C:
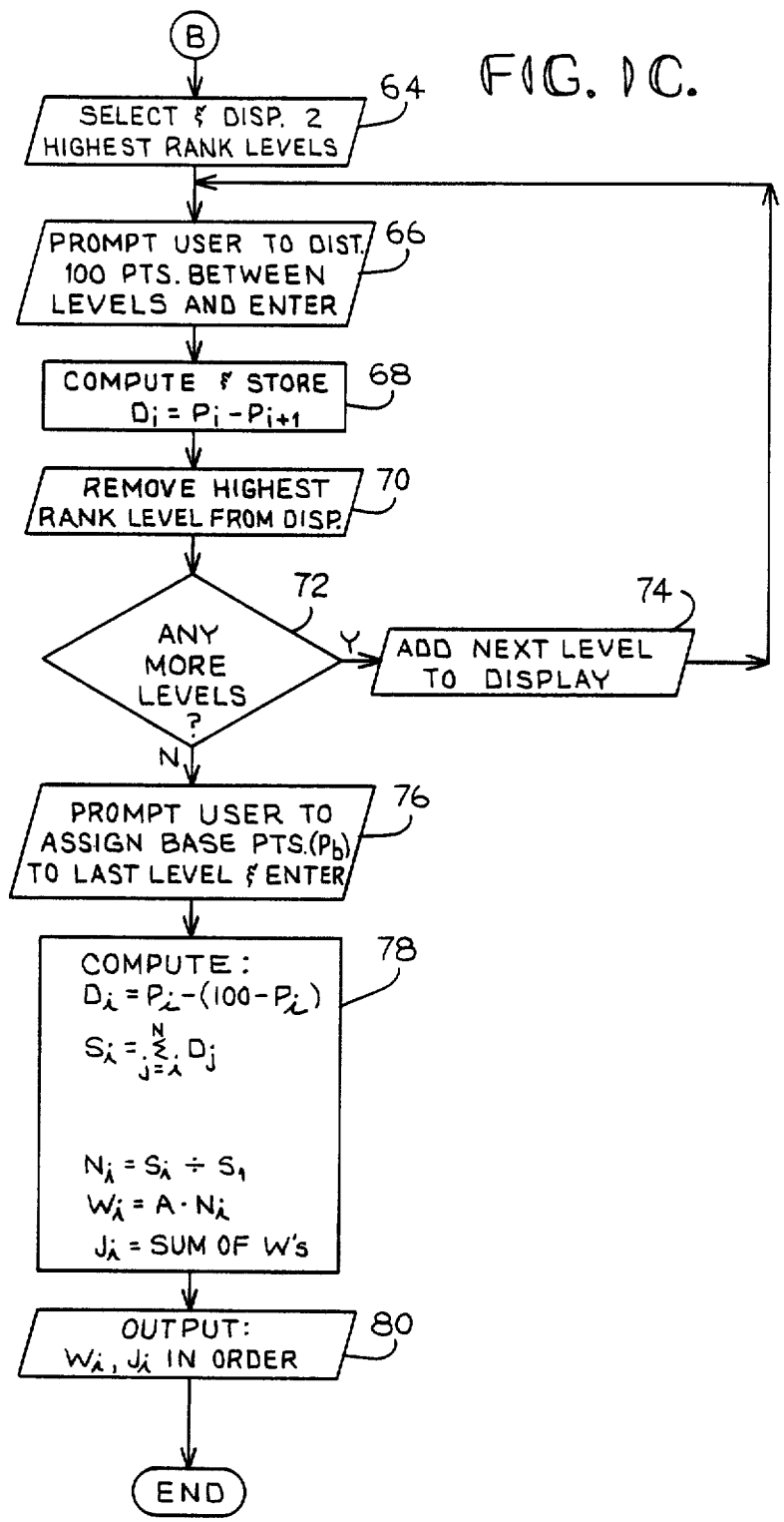

In FIG. 2, reference numeral 1 indicates a ROM for storing a system program, 2 a RAM for storing a cutting program and 3 an NC processor which has its general operation defined by the system program stored in the ROM 1 and interprets and executes the cutting program stored in the RAM 2 to drive a servo motor 4, effecting numerical control of a machine tool (not shown). Reference numeral 5 designates an input/output interface such as RS232C, through which interface 5 a main program is stored in the RAM 2 and, conversely, the contents of the RAM 2 are output to a tape puncher or the like, as is well known.

Reference numeral 6 identifies a processor for the application system (AS), which is connected via a bus 7 to peripheral circuits such as a writable-readable memory (for instance, a magnetic bubble memory 8), a control flag 9, data buffers 10 and 11, flags 12 and 13 and pointers 14 and 15. These peripheral circuits are connected via a bus 16 to the NC processor 3. The right-hand side of the one-dot chain line 17 in FIG. 2 is the NC side and the left-hand side is the application system side.

The data buffers 10 and 11 are buffer registers for data transmission and reception between the NC side and the AS side. The flags 12 and 13 are one-bit flags which indicate that data has been set in the data buffers 10 and 11, respectively. The pointers 14 and 15 are one-word pointers which indicate the data of the data buffers 10 and 11 which is currently being referred to. The control flag 9 is a flag which indicates for what purpose the data buffers 10 and 11 are used. These peripheral circuits 9 to 15 are accessible from either of the NC processor 3 and the AS processor 6.

FIGS. 3 and 4 are flowcharts showing examples of operations for sending a program from the NC side to the AS side, with FIG. 3 showing processing by the AS processor and FIG. 4 processing by the NC processor. S1 to S4 and S11 to S16 are the respective steps involved.

When issuing a read command to the AS processor 6 and the NC processor 3 by means (not shown), the AS processor 6 sets the control flag 9 to request the NS side to read (S1), and upon the receipt of this request (S11), the NC process 3 starts to read a program through the input/output interface 5 (S12). The processor 3 checks whether the data buffers 10 and 11 are empty or not (S13), and if so, it sets data (program) in them (S14). Such an operation is continued to final data, and when the final data is reached, its flag is set (S15, S16). By checking the flags 12 and 13, the AS processor 6 decides whether data has been set in the data buffers 10 and 11 (S2), and if so, it reads the data (S3). Such an operation is continued to the final data (S4).

Incidentally, the data buffers 10 and 11 may also be used alternately with each other, and either one of them can also be used as a ring buffer.

FIGS. 5 and 6 are examples of flowcharts for sending a program from the AS side to the NC side for punching the program, with FIG. 5 showing processing by the AS processor 6 and FIG. 6 processing by the NC processor 3. S21 to S25 and S31 to S34 indicate the respective steps involved.

When a punch command is issued to the AS processor 6 and the NC processor 3 by means (not shown), the AS processor 6 sets the control flag 9 to request the NC side to punch (S21) and sets data in the data buffers 10 and 11 which are empty (S22, S23). Upon accepting the punch request (S31), the NC processor 3 reads out the contents of the data buffers 10 and 11 and sends them via the input/output interface 5 to a puncher (not shown), thereby carrying out punch processing (S23).

In this way, the AS side can input and output a program via the input/output interface 5 provided on the NC side. Accordingly, for example, a program for the DI/DO control can be input into the AS side and output as a paper tape via the NC side.

Further, by using an arrangement which sends NC command data, in place of the above program, from the AS side to the NC side, it is also possible to drive the servo motor from the AS side and to prepare in the NC a program that the AS desires. FIGS. 7 and 8 are flowcharts showing an example of NC command program readout processing, with FIG. 7 showing processing on the AS side and FIG. 8 processing on the NC side. S41 to S45 and S51 to S56 indicate the respective steps involved. A request for program setting is made from the NC side by setting the control flag 9, and the transmission and reception of the NC command program are performed in the same manner as described above (S41 to S45 and S51 to S53). In this case, however, the NC processor 3 reads out data of the data buffers 10 and 11 and then interprets it to make preparations for execution (S54), thereafter carrying out execution (S56).

As described above, according to the present invention, since a program can be input to and output from an application system via an input/output interface of numerical control equipment, the invention has the advantage that the inputting of a program or the like to the application system and the entering of a punch command to a puncher can be achieved with a more economical arrangement than in the case where an input/output interface in provided separately. Moreover, since a command to the NC can be issued from the application system AS side, it is possible to actuate the servo motor from the AS side via the NC, and to prepare in the NC a program desired by the AS side.

What is claimed is:

1. A numerical control system comprising:
   an application system including:
   a processor for executing an application program and for delivering another program; and
   memory means, coupled to said processor, for storing the application program;
   numerical control equipment including:
   a servomotor;
   NC processor means for delivering the application program to said application system program, and for receiving the another program from said application system and executing the another program;
   an input/output interface coupled to said NC processor;
   at least one data buffer coupled to said processor and to said NC processor;
   at least one flag, coupled to said processor and to said NC processor, for indicating that data has been stored in said at least one data buffer;
   at least one pointer, coupled to said processor and to said NC processor, for indicating the address of the data in said at least one data buffer which is currently being referred to; and
   a control flag, coupled to said processor and to said NC processor, for indicating the purpose for which said at least one data buffer is being used.

* * * * *